US006825841B2

(12) United States Patent
Hampel et al.

(10) Patent No.: US 6,825,841 B2
(45) Date of Patent: Nov. 30, 2004

(54) GRANULARITY MEMORY COLUMN ACCESS

(75) Inventors: Craig E. Hampel, San Jose, CA (US); Richard E. Warmke, San Jose, CA (US); Frederick A. Ware, Los Altos, CA (US)

(73) Assignee: Rambus Inc., Los Altos, CA (US)

( * ) Notice: Subject to any disclaimer, the term of this patent is extended or adjusted under 35 U.S.C. 154(b) by 202 days.

(21) Appl. No.: 09/949,464

(22) Filed: Sep. 7, 2001

(65) Prior Publication Data

US 2003/0052885 A1 Mar. 20, 2003

(51) Int. Cl.[7] ................................................ G06F 15/76
(52) U.S. Cl. ........................ 345/519; 345/545; 345/567
(58) Field of Search ................................ 345/519, 533, 345/541–2, 559–561, 564–572, 536, 501, 530, 531, 545; 365/230.01, 230.06, 230.08; 711/200, 202, 211

(56) References Cited

U.S. PATENT DOCUMENTS

| | | | | | |
|---|---|---|---|---|---|
| 4,670,745 | A | * | 6/1987 | O'Malley et al. | 345/572 |
| 4,768,157 | A | * | 8/1988 | Chauvel et al. | 345/571 |
| 5,146,592 | A | * | 9/1992 | Pfeiffer et al. | 345/807 |
| 6,247,084 | B1 | * | 6/2001 | Apostol et al. | 710/108 |
| 6,366,995 | B1 | | 4/2002 | Vilkov et al. | |
| 6,393,543 | B1 | | 5/2002 | Vilkov et al. | |
| 2001/0037428 | A1 | * | 11/2001 | Hsu et al. | 711/105 |

OTHER PUBLICATIONS

Satoru Takase, Natsuki Kushiyama, "WP 24.1 A 1.6GB/s DRAM with Flexible Mapping Redundancy Technique and Additional Refresh Scheme," ISSCC99/Session 24/Paper WP 24.1, Feb. 17, 1999, 2 pages.
"SDRAM Device Operations," Samsung Electronics, 41 pages, date unknown.
"Micron Synchronous DRAM 128Mb:x32 SDRAM," Micron Technology, Inc., pp. 1–52, Rev. 9/00.
"GeForce3: Lightspeed Memory Architecture," NVIDIA Corporation Technical Brief, pp. 1–9, date unknown.

* cited by examiner

*Primary Examiner*—Kee M. Tung
(74) *Attorney, Agent, or Firm*—Lee & Hayes, PLLC

(57) ABSTRACT

A memory device includes multiple data I/O lanes and corresponding lane or column decoders. Instead of providing the same address to each column decoder, decoder logic calculates potentially different column addresses depending on the needs of the device utilizing the memory. For example, the column addresses might be based on a received CAS address and an accompanying offset. This allows data access at alignments that do not necessarily correspond to CAS alignments. The technique is utilized in conjunction with graphics systems in which tiling is used. In systems such as this, memory offsets are specified in terms of pixel columns and rows. The technique is also used in conjunction with a router such as a TCP/IP router, in which individual packets are aligned at CAS boundaries. In this situation, the decoder logic is alternatively configurable to allow access of either an information packet or a plurality of packet headers during a single memory access cycle.

83 Claims, 10 Drawing Sheets

GRANULARITY MEMORY COLUMN ACCESS

TECHNICAL FIELD

The invention relates to memory devices and in particular to memory devices in which variable, overlapping groups of storage units can be accessed.

BACKGROUND

Typical DRAM memory is accessed using sequential row and column operations, typically referred to as RAS (row address strobe) and CAS (column address strobe) operations. RAS operations specify row addresses, and CAS operations specify column addresses to select columns within the previously addressed rows.

FIG. 1 illustrates pertinent components of a typical DRAM memory device 10. DRAM 10 comprises a plurality of memory arrays 12, each having a plurality of memory storage units (represented as squares within arrays 12). In this simplified example, there are eight rows of memory storage units. There are six columns of storage units within each array. Each storage unit comprises one or a plurality of individual memory cells.

Memory device 10 has a row decoder 14 that receives a row address during a RAS operation. The row decoder is sometimes referred to as an "X" decoder.

The row address specifies a particular row of storage units. The RAS operation causes this row of storage units to be read into sense amplifiers (not shown). The same row is typically read from each of the multiple memory arrays 12. In FIG. 1, a row of storage units is highlighted to indicate that this row has been selected by row decoder 14.

For purposes of discussion, the storage units are labeled with identifiers comprising an alphabetic character with a numeric subscript. The alphabetic character indicates the array in which the storage unit resides, and the subscript indicates the column within the array. For example, storage unit $B_3$ is the storage unit at column 3 of array B.

The DRAM device 10 also has column decoders 16, which are also sometimes referred to as "Y" decoders or lane decoders. In this example, there is a column decoder associated with each of the four memory arrays 12. The column decoders correspond to data I/O lanes 18 through which data is communicated to and from memory device 10. Each data I/O lane comprises a number of individual I/O lines corresponding to the number of memory cells in each data storage unit. For example, each I/O lane might be a thirty-two bits in width. Combined, four I/O lanes of this width would allow 128 bits or 16 bytes of parallel data access.

The column decoders receive a column address that is specified during a CAS operation. Each column decoder is responsive to the specified column address to generate a column select signal (not specifically shown in FIG. 1) that selects a column of storage units from the row that was previously selected during a RAS operation. In the example shown, the specified column address has resulted in a column select signal corresponding to column 2—this is illustrated by the vertical line extending downward from the selected row and column within each of arrays 12.

In response to a column selection during a CAS operation, the column decoders transfer data from the selected storage units to or from I/O pins or connectors corresponding to the individual bit lines of the data lanes 18.

The data contained in a single row, which is specified during a RAS operation, is sometimes referred to as a page. Once a RAS operation has been completed, it is possible to complete multiple subsequent CAS operations to read various portions of the specified row or page, without the necessity of intervening RAS operations. Each CAS operation is carried out with a specified column address, and each column address corresponds to a unique set of storage units. In the example discussed above, where there are four data lanes of 32 bits each, each column address corresponds to a unique 16 bytes of information that can be read from or written to the memory device in parallel.

Note that some memory devices contain multiple banks of storage cells that may or may not share row and column decoders, although each bank does have dedicated sense amplifiers.

FIG. 2 shows an entire row or page of storage units 20, delineated by CAS boundaries that define the unique sets or groups of storage units that can be accessed during any given CAS cycle. With a CAS address of 0, the column decoders 16 of FIG. 1 select the first column of each memory array and transfer information to or from the storage units of those columns. With a CAS address of 1, the column decoders 16 select the second column of each memory array. For each CAS address, the lane decoders select a corresponding unique set or group of the storage units. Each unique set is formed by corresponding columns of the memory arrays that are presented in parallel at data I/O lanes 18.

Thus, the size of the data I/O path typically dictates the alignment at which data can be accessed. More specifically, the alignment of data access is fixed by the CAS boundaries; the addressing scheme divides the storage units into discrete, mutually exclusive groups corresponding to different CAS addresses, and access of any individual storage unit requires accessing the entire group to which the storage unit belongs. For example, storage unit $C_2$ can only be retrieved in a group that contains storage units $A_2$, $B_2$, $C_2$, and $D_2$,.

In some cases, it is desired to access a relatively small number of storage units that span multiple groups. Even though the number of desired storage units might be less than the number of storage units within any given group, it is necessary to perform two or more CAS operations if the desired storage units span two or more groups.

In FIG. 2, for example, suppose it is desired to access storage units $D_0$ and $A_1$. Because these two storage units fall under different CAS addresses, two CAS operations are required to access the two storage units. A first CAS operation accesses storage units $A_0$, $B_0$, $C_0$, and $D_0$, and a second CAS operation accesses storage units $A_1$, $B_1$, $C_1$, and $D_1$.

This has not been a significant limitation in the past, because the width of the data I/O path has been relatively limited, and most I/O accesses span several CAS addresses. However, current speed requirements are resulting in memory devices having relatively wide data paths, such as 16 bytes or wider. When the data path becomes this wide, many data accesses involve a number of contiguous storage units that is smaller than width of the data path. Furthermore, the nature of some data storage applications makes it difficult to ensure that memory accesses will be aligned at CAS boundaries. Memory accesses tend to be less efficient in applications such as this.

A computer graphics subsystem is an example of an application that might utilize small transfers at an alignment that does not necessarily correspond to CAS boundaries within a memory device. Computer graphics systems typically use DRAM memory to store pixel information. Such pixel information might include color component intensities, Z buffer data, texture information, video data, and other information related to an array of displayed pixels.

Computer graphics systems typically include a graphics controller that interacts with one or more DRAM devices. Access speed is very important in graphics subsystems, and a variety of techniques might be employed to optimize the efficiency of memory access cycles.

One such optimization technique is referred to as "tiling," in which rectangular tiles of graphics pixels are represented by portions of memory that can be accessed during a single CAS cycle. For example, in a system allowing data transfers of 16 bytes during each CAS operation, each graphics tile might be defined as a four-by-four square, represented by 16 bytes of data. Within the memory controller, memory is mapped in such a way that each four-by-four square is represented by 16 bytes that can be read or written in a single CAS cycle. In other words, the tiles are aligned at CAS boundaries.

FIG. 3 illustrates an example of tiling where each tile is defined as a four-by-four square of 16 pixels, and represented within DRAM memory by 16 bytes of data. The layout of storage units in FIG. 3 indicates their mapping to physical pixel locations—the storage units represent a two-dimensional array of pixels corresponding to the two-dimensional arrangement shown in FIG. 3. The storage units shown in FIG. 3 correspond to a row or page of data, in a DRAM whose rows or pages each include 128 bytes of data that can be accessed in mutually exclusive groups of 16 bytes per CAS operation. FIG. 3 shows the CAS addresses corresponding to individual tiles, ranging from 0 to 7. This arrangement allows eight tiles per row or page of DRAM memory.

Tiling works well because access to graphics data tends to be localized in two dimensions; a two-dimensional graphical object can often be efficiently accessed through one or more rectangular tiles such as illustrated in FIG. 3. Increasing DRAM bandwidths, however, threaten to actually decrease the efficiency with which such data can be accessed. This is because larger data paths result in larger tiles. In some cases, the size of the tile is larger than the actual graphical objects that need to be accessed. In other cases, the size of the tile is comparable in size to that of graphical objects in the system, but those objects are positioned across several tiles. In other words, the objects are not aligned at CAS boundaries. Thus, it might be necessary to access two or more tiles of data in situations where much less data is actually needed by the graphics processor.

FIG. 3 illustrates a situation such as this, in which a graphics processor requires access to a small triangular object that is represented by the hatched storage units shown in FIG. 3. Although the triangle has only six pixels, they are spread across three tiles. To process this object requires three CAS operations. Although the three CAS operations access forty-eight bytes, forty-two will not be used. This represents a significant inefficiency.

Other DRAM operations suffer from similar inefficiencies. Routers, for example, utilize DRAM memory to store data packets. Each packet, which typically includes a small header and a larger payload, is optimally stored in a region of DRAM memory that can be accessed in a single CAS operation. In other words, packets are aligned at CAS boundaries. During much of its operation, however, the router needs access only to the header, because the header contains the information needed by the router to determine how to handle the packet as a whole. Even though only the relatively small header is needed, the organization of DRAM memory typically requires retrieval of the entire packet in order to read the header information. In order to retrieve multiple headers, multiple CAS operations must be performed.

DETAILED DESCRIPTION

Variable Offset Column Access

Figure 4:
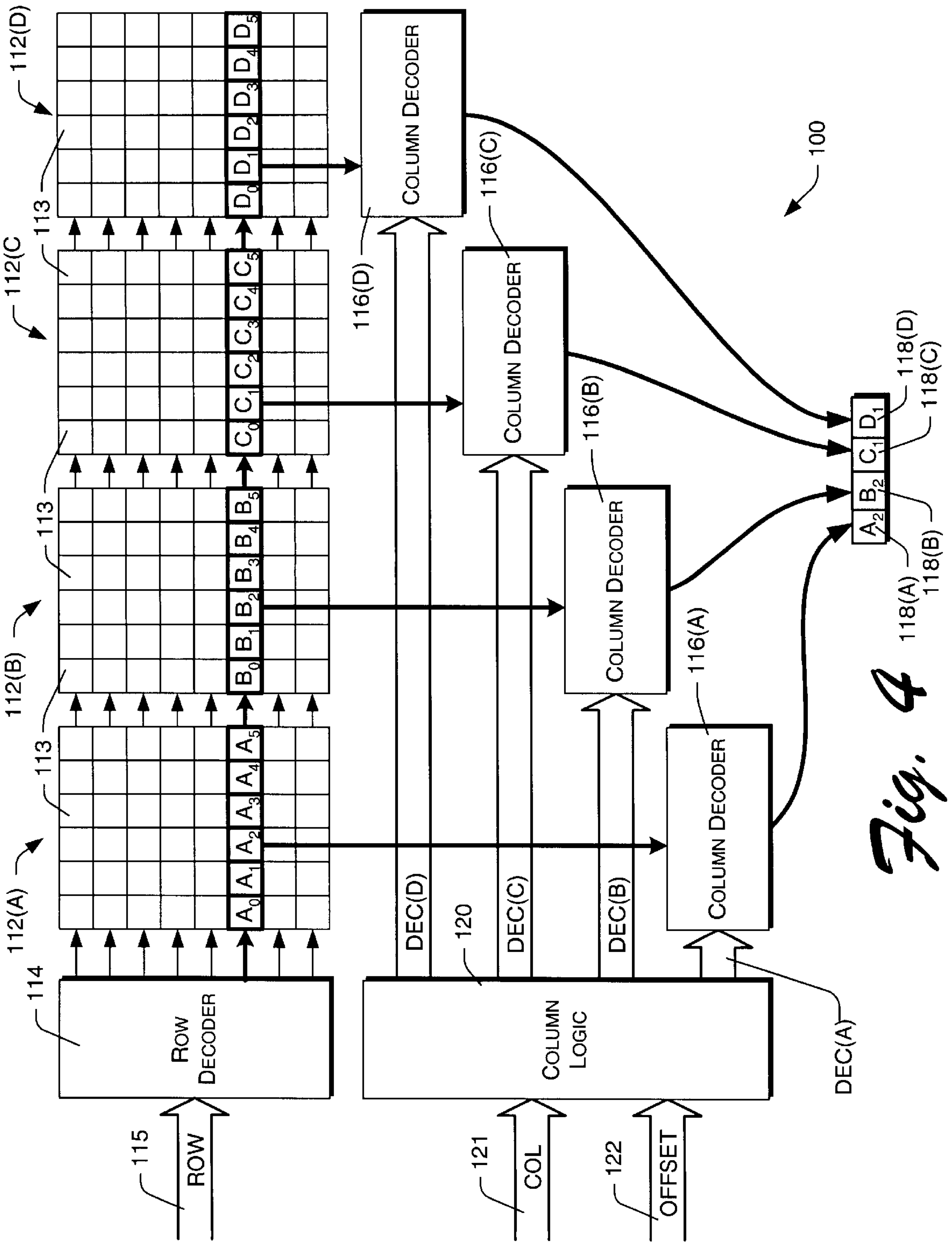
FIG. 4 is a simplified block diagram showing pertinent components of a memory device allowing variable offsets.

FIG. 4 shows pertinent components of an integrated circuit memory device 100 that allows variable-offset CAS operations. Memory device 100 comprises a plurality of memory arrays 112(A)–112(D) each of which comprises a plurality of storage units or memory cells 113 arranged in rows and columns. A row decoder 114 receives a row address 115 during a RAS cycle or operation to specify a row of the arrays to be read into sense amplifiers (not shown) for subsequent CAS access cycles or operations. A row of storage units is shown highlighted to indicate an example of row selection as a result of a RAS operation. In this example, the sixth row of storage units has been selected.

Row decoder 114 is sometimes referred to as a Y decoder. A row of storage units is sometimes referred to as a memory page.

Each storage unit comprises one or more memory cells. For example, a storage unit might comprise eight memory cells, or a byte. Alternatively, a storage unit might comprise multiple bytes of memory cells.

In FIG. 4 and in the following discussion and figures, an individual storage unit will be referred to by an alphabetic character and a numeric subscript, such as "$B_2$." The alphabetic character indicates the memory array of the storage unit, and the subscript indicates the column within that array. Thus, storage unit $B_2$ is the storage unit at column 2 of memory array 112(B). It will be assumed that row selection has already taken place, and that the indicated storage unit is from the previously selected row.

Memory device 100 further comprises column selection logic that selects one or more columns of storage units from the currently selected row. The column selection logic includes a plurality of column decoders 116(A)–116(D). In this example, an individual column decoder 116 corresponds to and is associated with each of memory arrays 112. The column decoders correspond respectively to parallel data I/O lanes 118(A)–118(D) through which data is communicated to and from memory device 100. Each data I/O lane 118 comprises a number of individual I/O lines corresponding to the number of memory cells in an individual data storage unit. For example, each I/O lane might be eight bits or a byte in width. The column decoders are responsive to decoder addresses or column addresses received during a memory cycle to select columns from the respective memory arrays for access through the data I/O lanes.

The collective data I/O lanes form a parallel data I/O path through which groups of storage units are accessed in parallel. Although only four I/O lanes are shown in FIG. 4, a memory device might desirably have a larger number of memory arrays 112, column decoders 116, and data I/O lanes 118. For example, a 32 byte wide data path might be implemented with 32 memory arrays, column decoders, and I/O lanes, each of which is one byte in width. Alternatively, a data path of the same width might be implemented by four memory arrays as shown in FIG. 4, where each storage unit is eight bytes or 32 bits in width. Note also that the internal data width of the memory device may be different than the external interface.

Column decoders 116 are sometimes referred to as X decoders, and are also referred to herein as lane decoders.

The column selection logic of memory device 100 further comprises column decoder address specification logic 120 from which the column decoders 116 are configured to receive decoder addresses or column specifications. The decoder address specification logic is responsive to a received address specification to select the groups of memory cells for access through the data I/O path formed by the collective data I/O lanes 118. The address specification logic 120 allows selection of memory cells at a granularity that is different than and preferably less than the width of the data I/O path. This is accomplished in the described embodiment by calculating potentially different decoder addresses for the multiple column decoders 116(A)–116(D). Specifically, at least two of the calculated decoder addresses supplied to the column decoders during a given memory cycle can be different from each other.

Figure 1:
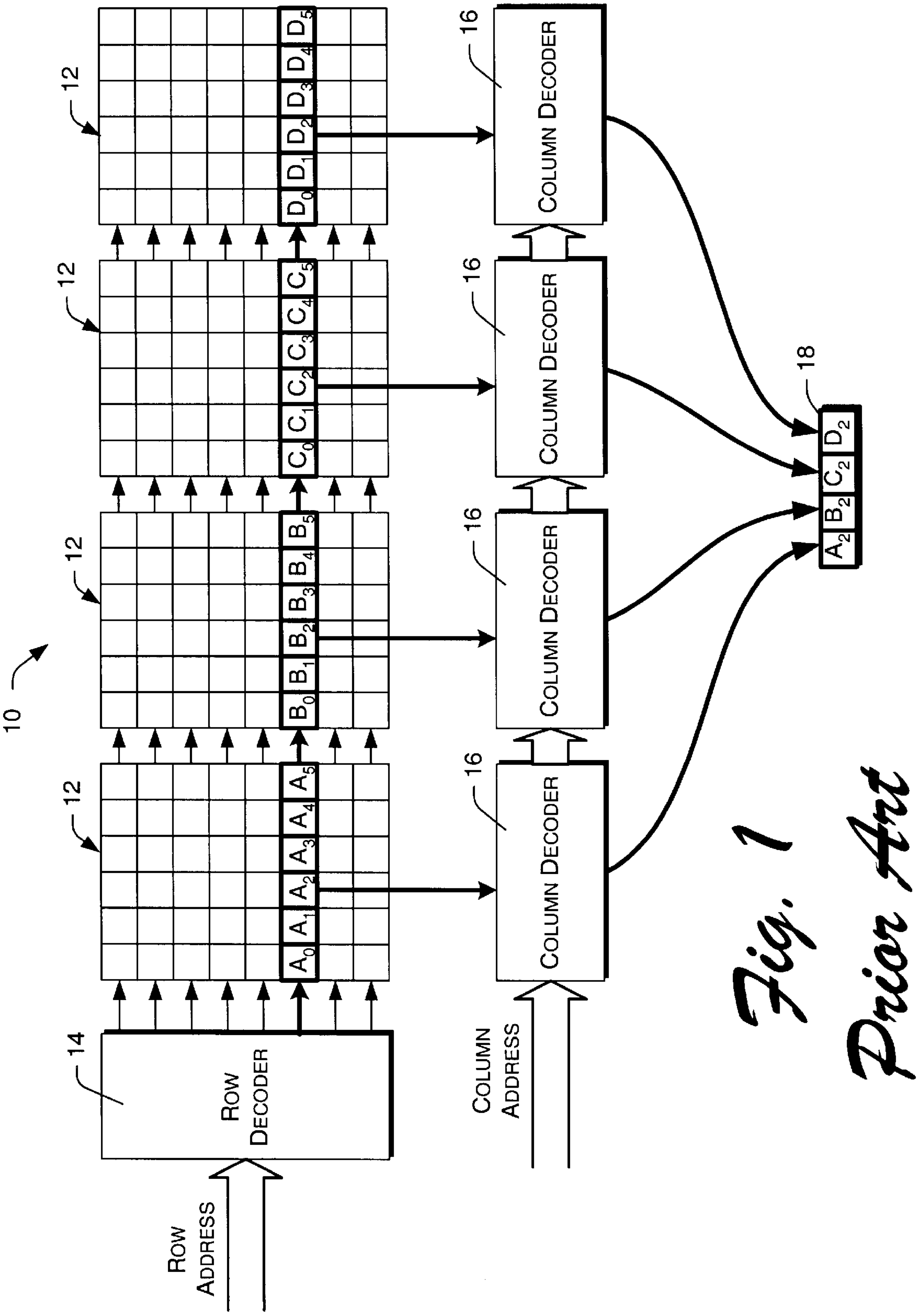
Fig. 1 Prior Art
FIG. 1 is a simplified block diagram showing pertinent components of a prior art DRAM.
Figure 2:
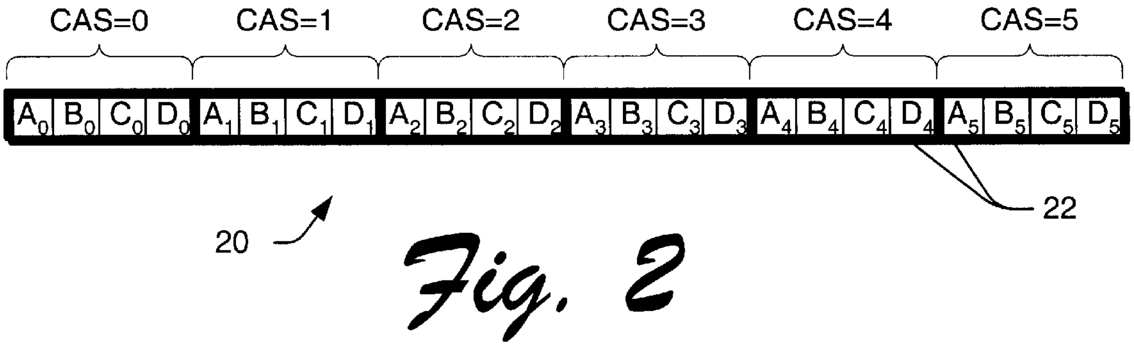
Fig. 2 Prior Art
FIG. 2 illustrates the concept of CAS boundaries in the prior art.

The column selection logic allows specification and selection of overlapping groups of memory cells for parallel access through data I/O lanes 118. The term "overlapping" is used herein to indicate groups of memory cells or storage units that are not mutually exclusive. That is, different groups can include one or more common memory cells or storage units. For example, a first group might include a particular storage unit such as storage unit $C_1$, and another, different group might also include the same storage unit $C_1$. To make the example more specific, storage unit $C_1$ might be accessible as part of any of the following four, different, non-mutually-exclusive groups: $\{D_0, A_1, B_1, C_1\}$, $\{A_1, B_1, C_1, D_1\}$, $\{B_1, C_1, D_1, A_2\}$, and $\{C_1, D_1, A_2, B_2\}$. Other configurations of the column selection logic might of course allow different group compositions. Thus, the concept of a "group" of storage units is not limited to storage units that are "adjacent" each other in a linear arrangement of storage units such as depicted in FIG. 2.

In one embodiment, address specification logic 120 receives a column address 121 and one or more adjustment values 122 during a CAS operation. In response to the column address and adjustment value(s), the decoder logic 120 calculates or derives decoder addresses or specifications for the individual column decoders 116. In this example, the adjustment value is a column offset or lane offset, indicating the number of columns or I/O lanes by which an offset is desired from a base column address. As shown in FIG. 4, the respective column decoders are configured to receive potentially different decoder addresses during a single memory access cycle. The column decoders are responsive to the received decoder addresses to respectively select different columns or sets of memory cells for access through I/O lanes 117 during a memory cycle. Thus, in contrast to the prior art device described above in the "Background" section, the column decoders are not all responsive to a common column address. Rather, different addresses can be provided to different column decoders, depending on the specified offset.

Although the disclosed embodiment is configured to receive both an address and an offset as part of a CAS operation, the offset can be provided in different ways. For example, the offset can be provided to the memory device using a command other than a CAS command and stored in a memory device register before an actual CAS operation or other memory access operation. In one embodiment, a special command can be used to instruct the memory device regarding whether or not a previously provided offset should be applied in combination with a CAS or other memory address during a memory access operation. Alternatively, the CAS command itself might indicate whether the offset should be applied. As yet another alternative, the memory device might be set by a command or through some other means into one of a plurality of addressing modes, in which at least one of the addressing modes uses supplied or stored offsets in combination with received CAS addresses. At least one other of the addressing modes would ignore offset values, in which case the memory cells would be accessed in mutually exclusive groups. A similar result could be obtained by setting the offset value to zero.

Furthermore, although the column selection logic is implemented in FIG. 4 by providing independent column addresses to the four column decoders 116, other embodiments might be configured differently. For example, each column decoder might be configured to receive the column address and offset, and to individually account for the offset when making a column selection.

Figure 5:
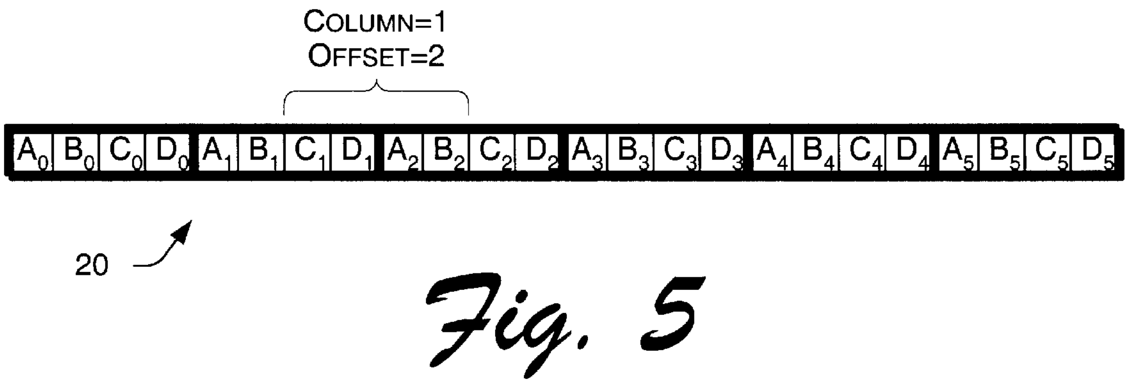
FIG. 5 illustrate an arrangement of memory storage units and how they are accessed when using a variable offset.

FIG. 5, in conjunction with FIG. 4, illustrates an example of how different storage units can be selected. FIG. 5 shows the storage units of the row that has been selected in FIG. 4 by way of a previous RAS operation. As explained in the "Background" section, above, such a row comprises a page of storage units. FIG. 5 shows the memory page arranged in a linear sequence, as it might be viewed in many systems. A column address equal to 0 corresponds to storage units $A_0$, $B_0$, $C_0$, and $D_0$; a column address equal to 1 corresponds to storage units $A_1$, $B_1$, $C_1$, and $D_1$; a column address equal to 2 corresponds to storage units $A_2$, $B_2$, $C_2$, and $D_2$; and so on. Column or lane offsets are specified relative to the illustrated linear sequence of storage units.

In this case, assume it is desired to access storage units $C_1$, $D_1$, $A_2$, and $B_2$. This set of storage units is not aligned at a CAS boundary, but spans two column addresses. However, these storage units can be accessed in a single memory access operation by specifying a column address equal to 1 and a column or lane offset equal to 2. It should be noted that each of the requested storage units corresponds to a different data I/O lane 118 and associated lane decoder 116. This will be the case for any contiguous set of storage units whose number is less than or equal to the number of data I/O lanes.

Decoder address specification logic 120 receives the column address of 1 and an adjustment value or lane offset value of 2. In response to receiving these values, logic 120 calculates decoder addresses for the respective column or lane decoders 116.

Vertical arrows in FIG. 4 indicate the column specified by logic 120 for each column decoder in this example. In response to the different column specifications, a different column can potentially be selected from each of the respective arrays 112. In this example, the two left-most column decoders 116(A) and 116(B) are supplied with column specifications corresponding to column 2 of each of the respective arrays 112(A) and 112(B), thereby accessing storage units $A_2$ and $B_2$ (column 2 of arrays 112(A) and 112(B)). The two right-most column decoders 116(C) and 116(D) are supplied with column specifications corresponding to column 1 of each of the respective arrays 112(C) and 112(D), thereby accessing storage units $C_1$ and $D_1$ (column 1 of arrays 112(C) and 112(D)). Thus, as illustrated at the bottom of FIG. 4, storage units $C_1$, $D_1$, $A_2$, and $B_2$ are transferred through I/O lanes 118.

Note that the storage units at I/O lanes 118 are out of their normal order, due to their natural lane assignments. That is, a storage unit from array 112(A) will always be accessed through I/O lane 118(A), a storage unit from array 112(B) will always be accessed through I/O lane 118(B), and so on. This is because any given storage unit is accessible in this implementation through one and only one I/O lane, and each storage unit is always accessible through the same I/O lane. Additional logic may be implemented within memory device 100 to restore the normal ordering at pins 118. However, memory device 100 preferably does not include such additional logic; devices that access memory device 100 are preferably configured to account for the variable ordering when using this mode of memory access.

The configuration shown in FIG. 4 improves upon the CAS alignment of the prior art by allowing column offsets at a granularity that is equal to that of the column decoders and data I/O lanes. Stated alternatively, memory accesses do not need to be aligned at CAS boundaries. By reducing the size of individual I/O lanes and increasing their number, alignment granularity can be reduced to whatever level is desired. Furthermore, such small granularity can be achieved with very little in the way of additional hardware and without increasing the number of core I/O data bits. Additional hardware is kept to a minimum by utilizing existing column I/O lines rather than creating new data paths.

Although this embodiment illustrates one example of how a particular storage unit might be available in one of four different groups, other embodiments might provide for different group configurations in which a storage unit is accessible as part of two or more selectable groups of storage units. In other words, the storage units comprising a group are not necessarily limited to storage units that appear "adjacent" each other in the linear arrangement illustrated in FIG. 5. A good example of this is described below, in the subsection entitled "Packet Router".

Column logic 120 can be implemented in different ways, such as with an arithmetic logic unit or through the use of a lookup table. Actual parameters will depend the number of data I/O lanes 118. In this example, decoder addresses are calculated or derived from the column address and lane offset as indicated in the following table, where COL is the received column address; OFFSET is the received adjustment value, column offset, or lane offset; and DEC(a), DEC(b), DEC(c), and DEC(d) are the decoder addresses that are calculated by logic 120 and supplied to the four column decoders 116(A), 116(B), 116(C), and 116(D), respectively. Each row of the table indicates how a decoder address is calculated for a particular lane decoder as a function of the four possible OFFSET values.

TABLE 2

| | OFFSET | | | |
|---|---|---|---|---|
| | 0 | 1 | 2 | 3 |
| DEC(a) | COL | COL + 1 | COL + 1 | COL + 1 |
| DEC(b) | COL | COL | COL + 1 | COL + 1 |
| DEC(c) | COL | COL | COL | COL + 1 |
| DEC(d) | COL | COL | COL | COL |

The table can be extended to cover situations in which there are more than four I/O lanes and corresponding column decoders.

2-D Spatial Offset in a Graphics System

Figure 6:
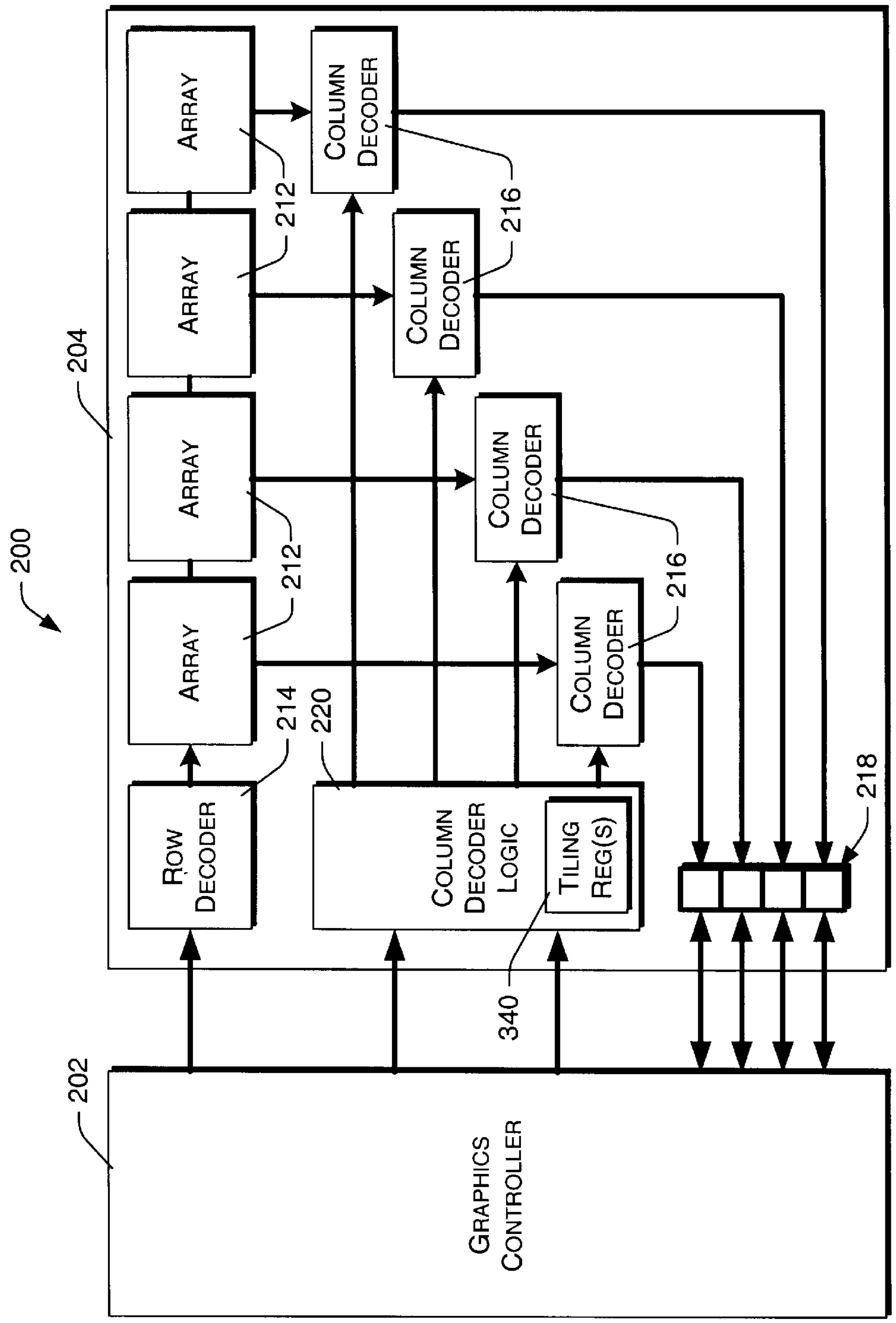
FIG. 6 is a simplified block diagram showing pertinent components of a graphics subsystem incorporating a memory device similar to that shown in FIG. 4.

FIG. 6 shows a graphics system 200 that includes a graphics controller 202 and one or more DRAM memory devices 204 configured for use as graphics memory. Each memory device 204 is configured similarly to the device described above with reference to FIG. 4, to allow variable offsets. In this embodiment, the memory storage units are configured and mapped to represent rectangular tiles of graphics pixels having at least two pixel dimensions. As will become apparent in the following discussion, the offsets in this embodiment can be specified in terms of horizontal and/or vertical pixel rows, relative to the rectangular graphics tiles. The offsets are not constrained to multiples of the two pixel dimensions.

Each memory device includes a plurality of memory arrays 212 and an associated row decoder 214. Each memory array 212 comprises a plurality of memory storage units configured to store graphics memory data.

Memory device 200 includes column or lane selection logic that includes a lane decoder 216 associated with each array 212. There is a data I/O lane 218 corresponding to each array 212 and lane decoder 216. The data I/O lanes are accessed in parallel by graphics controller 202. The column or lane selection logic also includes address specification logic 220, also referred to herein as decoder logic, which calculates decoder addresses for each of lane decoders 216. As described above, the lane decoders are configured to receive independent address specifications from decoder logic 220. The address specifications provided by decoder logic 220 are calculated or derived from a CAS column address and one or more adjustment values provided by graphics controller 202. In this example, the adjustment values comprise one or more dimensional offset values specified in terms of pixel columns and rows, as will be described in more detail below. The lane decoders are responsive to the address specifications to select memory storage units for transfer through data lanes 218. As with the embodiment previously described, the column selection logic is not constrained to accessing corresponding columns of the arrays in parallel. Rather, a single memory operation can potentially access, in parallel, a different column from each of the available arrays.

In the described embodiment, each storage unit, data I/O lane, and lane decoder is a single byte in width, although other embodiments might utilize different widths. For example, each storage unit, data I/O lane, and lane decoder might be multiple bytes in width.

Graphics controller 202 implements tiling, in which the storage units retrieved in a single CAS operation are mapped to a two-dimensional rectangle of display pixels. During each memory cycle, the parallel data I/O lanes collectively transfer memory data corresponding to a rectangular tile of graphics pixels.

Figure 7:
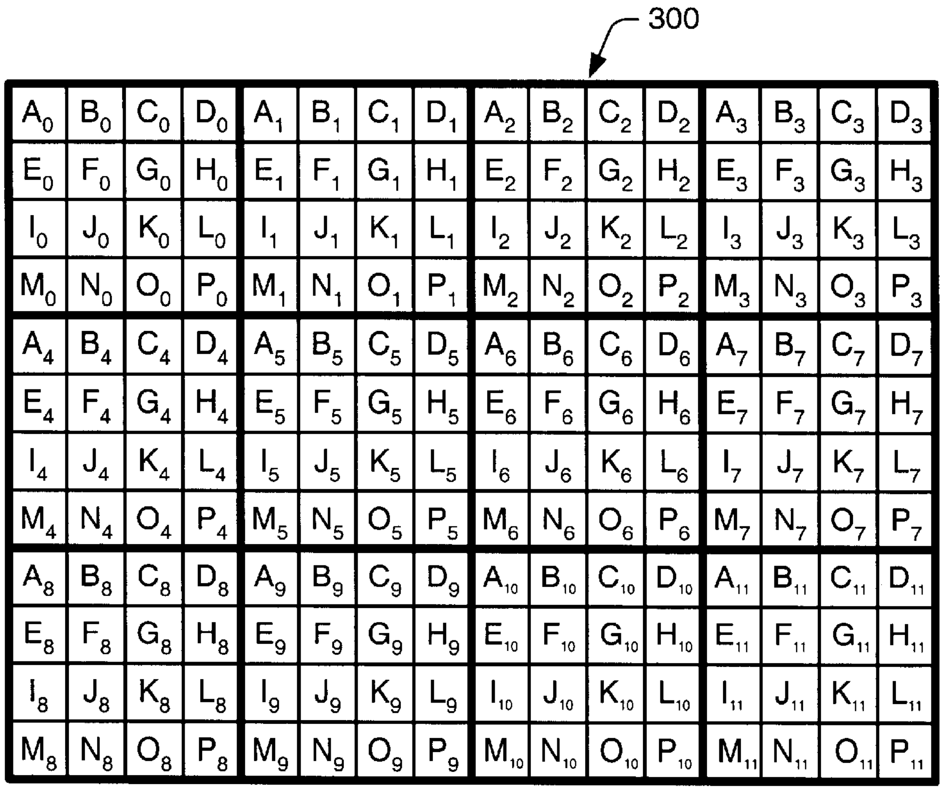
FIG. 7 illustrates an arrangement of memory storage units when used in conjunction with graphics tiling techniques.

FIG. 7 shows an example of how a graphics controller might map storage units to physical display locations. Although only four memory arrays are shown in FIG. 6 for purposes of illustration, it is assumed in FIG. 7 that memory device 204 has sixteen memory arrays, "A" through "P". It is further assumed that there is a dedicated lane and lane decoder for each of the sixteen memory arrays. Thus, sixteen storage units can be accessed in parallel during a single CAS operation.

In this example, each set of sixteen storage units is mapped to a four-by-four square of pixels. FIG. 7 shows a row or page 300 of such mapped storage units, comprising a total of twelve four-by-four tiles. The tiles are arranged with a width W of four tiles. FIG. 7 uses similar nomenclature as used above in designating storage units, an alphabetic character with a numeric subscript: the character indicates the array of the storage unit (A through P) and the subscript indicates the column within the array. Thus, the first or upper left tile contains storage units $A_0$ through $P_0$; the second tile contains storage units $A_1$ through $P_1$; and so on; continuing in order from left to right and from top to bottom.

In a conventional system, it would be possible to access this memory only at the granularity of a tile. That is, each CAS operation could specify a single column address, which would correspond to one of the twelve tiles shown in FIG. 7. In the system of FIG. 6, however, memory device 204 is configured to allow X (horizontal) and Y (vertical) spatial offsets so that any four-by-four group of storage units can be accessed in a CAS operation, regardless of tile boundaries or alignment. As in the previously described embodiment, this is accomplished by calculating decoder addresses for the individual lane decoders such that two or more of the decoder addresses are potentially different from each other, or by otherwise selecting columns of arrays 212 in a way that allows different columns to be selected for at least two of the arrays 212. This allows for selection and access, during respective memory operations, of overlapping tiles—a given storage unit can be accessed as part of a number of different tiles. As an example, storage unit $K_1$ of FIG. 7 can be accessed as part of a 4 by 4 tile whose upper left corner is formed by storage unit $D_0$, by a 4 by 4 tile whose upper left corner is formed by storage unit $F_1$, or as part of a number of different overlapping tiles. As above, the term "overlapping" is used to indicate groups of memory cells or storage units that are not mutually exclusive. That is, different groups can include one or more common memory cells or storage units. Although the described example defines such groups in terms of two-dimensional tiles, groups could be defined in other ways and are not necessarily limited to storage units that are "adjacent" each other in a two-dimensional arrangement of storage units such as depicted in FIG. 7. Offsets are specified by graphics controller 202 to memory device 204 during or prior to CAS operations. The offsets are specified in terms of the pixel columns and rows of the current tiling scheme, and thus comprise a horizontal or X pixel offset value and/or a vertical or Y pixel offset value. In response to receiving X and Y offsets, the decoder logic 220 calculates appropriate decoder addresses for each of the lane decoders 216. The offsets are not constrained to multiples of the tiling pixel dimensions. In the described embodiment, for example, the offsets are not constrained multiples of four, which is both the horizontal and vertical dimension of the tiles.

Figure 8:
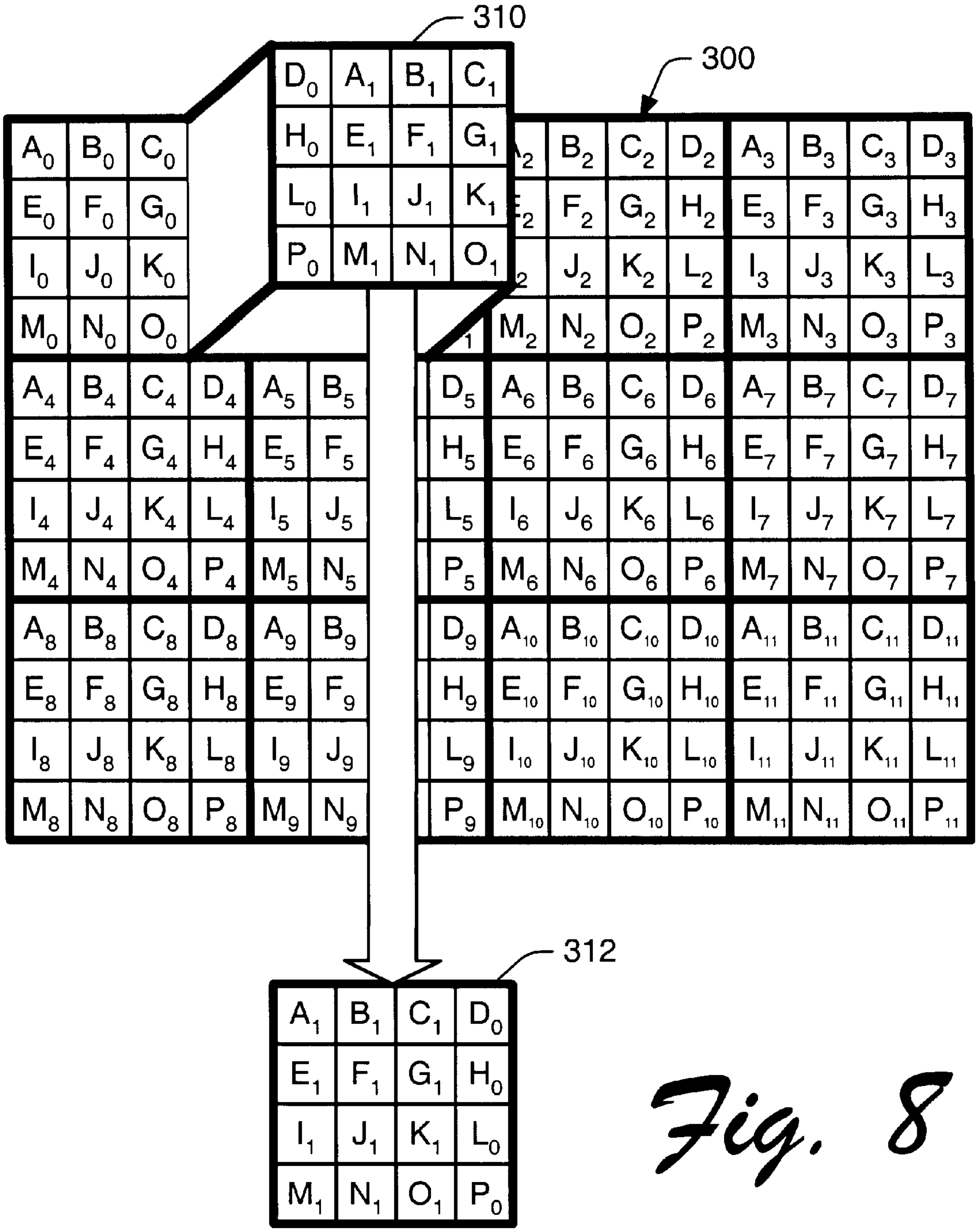
FIG. 8 illustrates an example of a horizontal offset in the system of FIG. 6.

FIG. 8 illustrates an example of a horizontal offset. Specifically, it is desired in this example to access a tile 310 whose upper left corner is formed by the $D_0$ storage unit. This corresponds to column address 0, with an offset of three columns in the X or horizontal direction. More specifically, this tile comprises the following four-by-four array of storage units, in order from left to right and then top to bottom: $D_0$, $A_1$, $B_1$, $C_1$, $H_0$, $E_1$, $F_1$, $G_1$, $L_0$, $I_1$, $J_1$, $K_1$, $P_0$, $M_1$, $N_1$, and $O_1$.

The result of this selection at the data I/O lanes of memory device 204 is shown by an array 312 of storage units corresponding to data I/O lanes 218. As in the previous, one-dimensional example, the storage units appear out of their normal order due to their natural lane assignments. For example, storage unit $A_1$ will always appear on the data I/O lane corresponding to array "A", even when this storage unit does not correspond to the upper left corner of the tile being accessed. Thus, as with the previous example, any given storage unit is accessible in this implementation through one and only one I/O lane. Graphics controller 202 preferably has logic for internally dealing with the storage units in this format.

The following table indicates the logic implemented by decoder logic 220 to perform an X or horizontal offset with respect to the illustrated configuration. Specifically, each row of the table indicates how a decoder address is calculated for a particular lane decoder DEC(n) as a function of the four possible X OFFSET values.

TABLE 2

| | OFFSET | | | |
|---|---|---|---|---|
| | 0 | 1 | 2 | 3 |
| DEC(a) | COL | COL + 1 | COL + 1 | COL + 1 |
| DEC(b) | COL | COL | COL + 1 | COL + 1 |
| DEC(c) | COL | COL | COL | COL + 1 |
| DEC(d) | COL | COL | COL | COL |
| DEC(e) | COL | COL + 1 | COL + 1 | COL + 1 |
| DEC(f) | COL | COL | COL + 1 | COL + 1 |
| DEC(g) | COL | COL | COL | COL + 1 |
| DEC(h) | COL | COL | COL | COL |
| DEC(i) | COL | COL + 1 | COL + 1 | COL + 1 |
| DEC(j) | COL | COL | COL + 1 | COL + 1 |
| DEC(k) | COL | COL | COL | COL + 1 |
| DEC(l) | COL | COL | COL | COL |
| DEC(m) | COL | COL + 1 | COL + 1 | COL + 1 |
| DEC(n) | COL | COL | COL + 1 | COL + 1 |
| DEC(o) | COL | COL | COL | COL + 1 |
| DEC(p) | COL | COL | COL | COL |

The details of this table will of course vary depending on the particular tiling arrangement in use and on the number of individual lane decoders. Note that tiles need not always be square: the tiling arrangement could utilize tiles that are longer in one dimension than the other.

Figure 9:
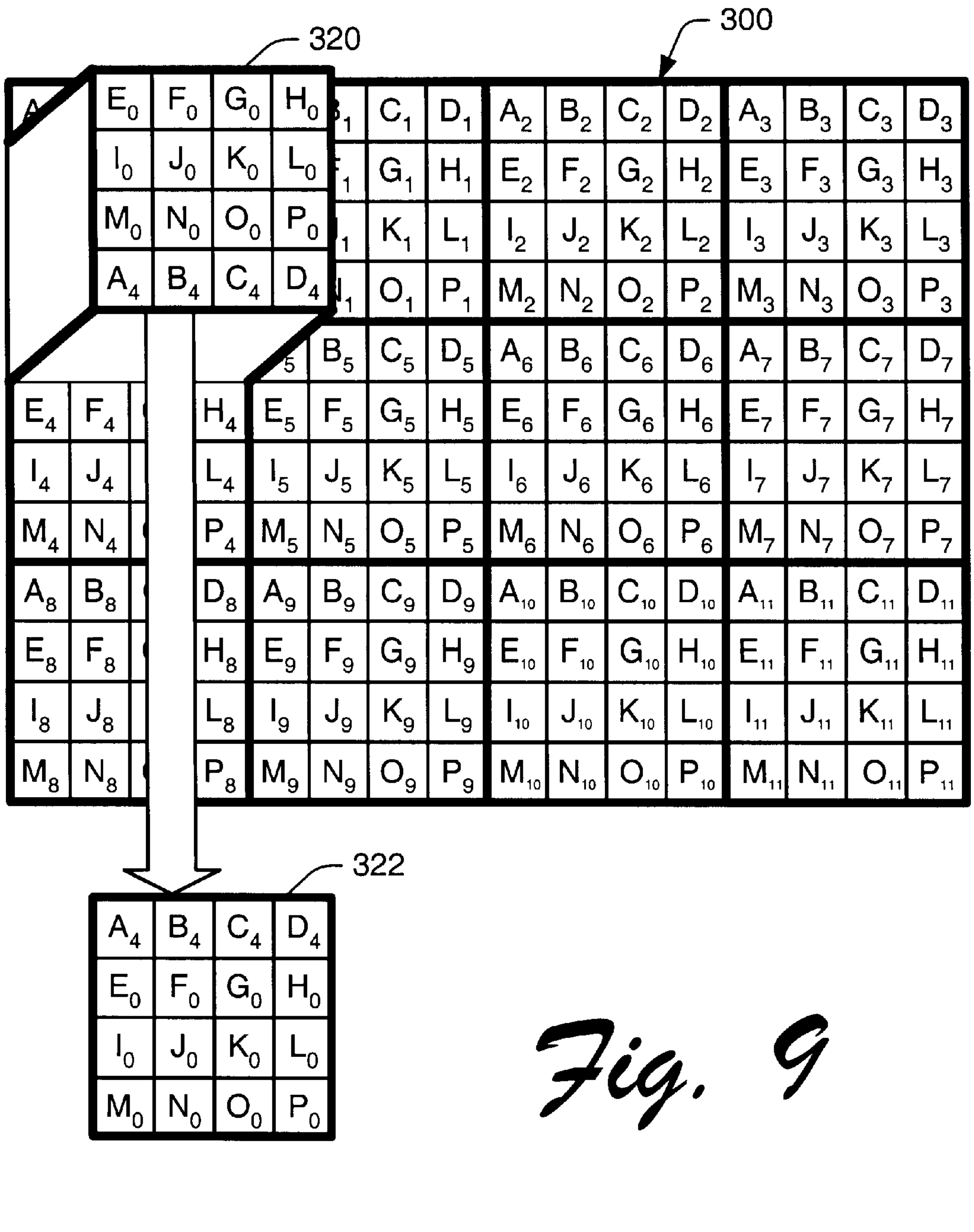
FIG. 9 illustrates an example of a vertical offset in the system of FIG. 6.

FIG. 9 illustrates an example of a vertical offset. Specifically, it is desired in this example to access a tile 320 whose upper left corner is formed by the $E_0$ storage unit. This corresponds to column address 0, with an offset of one column in the Y or vertical direction. More specifically, this tile comprises the following four-by-four array of storage units, in order from left to right and then top to bottom: $E_0$, $F_0$, $G_0$, $H_0$, $I_0$, $J_0$, $K_0$, $L_0$, $M_0$, $N_0$, $O_0$, $P_0$, $A_4$, $B_4$, $C_4$, and $D_4$.

The result of this selection at the data I/O lanes of memory device 204 is shown by array 322. Again, the storage units appear out of their normal order due to their natural lane assignments. For example, storage unit $A_4$ will always appear on the data I/O lane corresponding to array "A", even when this storage unit does not correspond to the upper left corner of the tile being accessed. Thus, as with the previous example, any given storage unit is accessible in this implementation through one and only one I/O lane. Graphics controller 202 preferably has logic for internally dealing with the storage units in this format.

The following table indicates the logic implemented by decoder logic 220 to perform a Y or vertical offset with respect to the illustrated configuration. Specifically, each row of the table indicates how a decoder address is calculated for a particular lane decoder DEC(n) as a function of the four possible Y OFFSET values. W is number of tiles in the horizontal direction. For example, W is equal to four in the tiling scheme illustrated in FIG. 7.

TABLE 3

| | OFFSET | | | |
|---|---|---|---|---|
| | 0 | 1 | 2 | 3 |
| DEC(a) | COL | COL + W | COL + W | COL + W |
| DEC(b) | COL | COL + W | COL + W | COL + W |
| DEC(c) | COL | COL + W | COL + W | COL + W |
| DEC(d) | COL | COL + W | COL + W | COL + W |
| DEC(e) | COL | COL | COL + W | COL + W |
| DEC(f) | COL | COL | COL + W | COL + W |
| DEC(g) | COL | COL | COL + W | COL + W |
| DEC(h) | COL | COL | COL + W | COL + W |
| DEC(i) | COL | COL | COL | COL + W |
| DEC(i) | COL | COL | COL | COL + W |
| DEC(j) | COL | COL | COL | COL + W |
| DEC(k) | COL | COL | COL | COL + W |
| DEC(l) | COL | COL | COL | COL + W |
| DEC(m) | COL | COL | COL | COL |
| DEC(n) | COL | COL | COL | COL |
| DEC(o) | COL | COL | COL | COL |
| DEC(p) | COL | COL | COL | COL |

Figure 10:
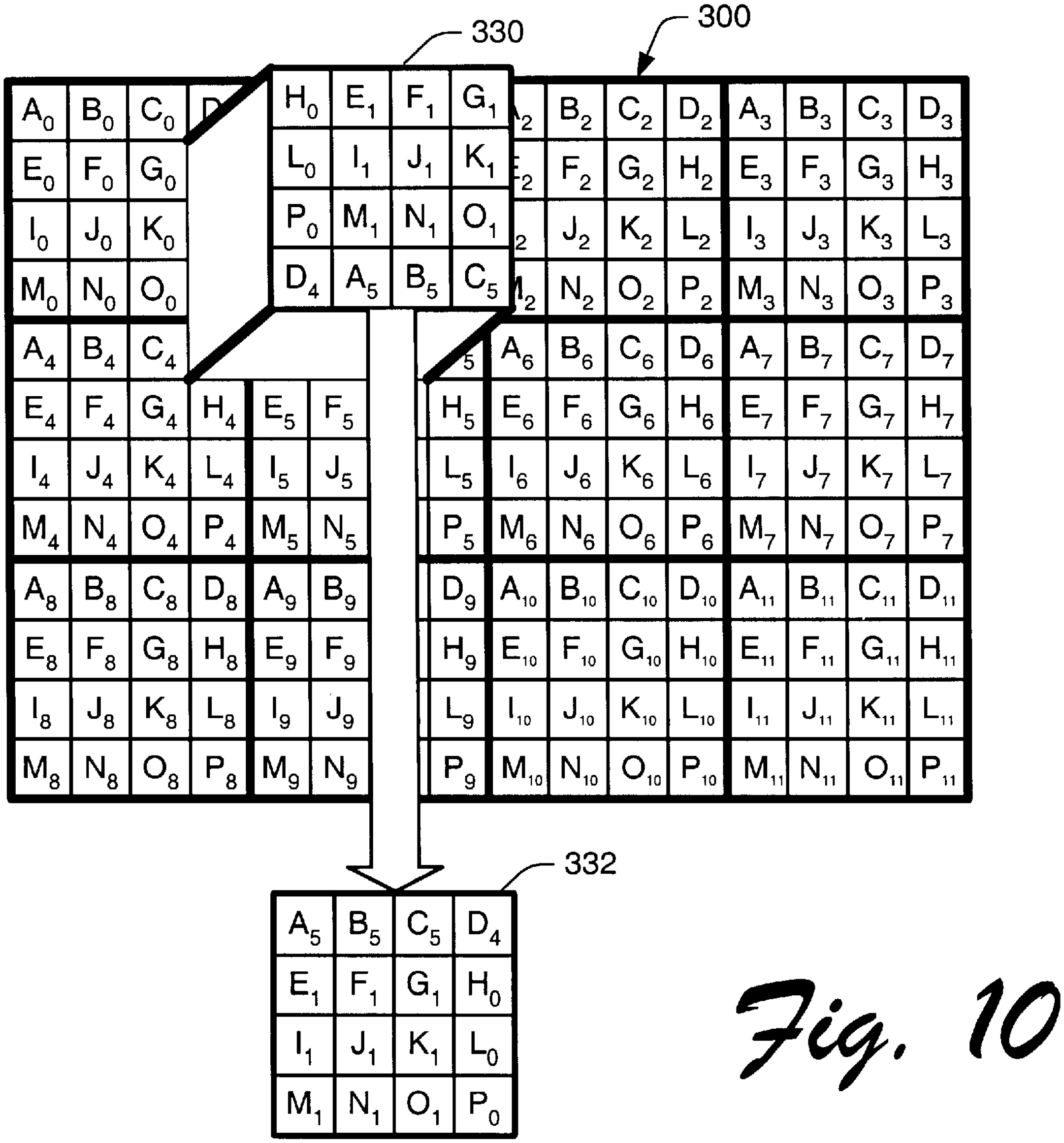
FIG. 10 illustrates an example of both a horizontal offset and a vertical offset in the system of FIG. 6.

FIG. 10 illustrates an example of a combination of a horizontal and a vertical offset. Specifically, it is desired in this example to access a tile 330 whose upper left corner is formed by the $H_0$ storage unit. This corresponds to column address 0, with a horizontal or X offset of three and a vertical or Y offset of one. More specifically, this tile comprises the following four-by-four array of storage units, in order from left to right and then top to bottom: $H_0$, $E_1$, $F_1$, $G_1$, $L_0$, $I_1$, $J_1$, $K_1$, $P_0$, $M_1$, $N_1$, $O_1$, $D_4$, $A_5$, $B_5$, and $C_5$.

The result of this selection at the data I/O lanes of memory device 204 is shown by array 332, which corresponds to data I/O lanes 218 of FIG. 6. The storage units appear out of their normal order due to their natural lane assignments. For example, storage unit $A_5$ will always appear on the data I/O lane corresponding to array "A", even when this storage unit does not correspond to the upper left corner of the tile being accessed. Graphics controller 202 preferably has logic for internally rearranging the data to account for this characteristic.

In order to perform an X and Y offset, decoder logic 220 is configured to calculate individual column decoder addresses in accordance with the preceding two tables. Specifically, decoder logic first performs the logic of Table 2 with respect to the received column address, and then performs the logic of Table 3 with respect to the column addresses resulting from Table 2.

The tables set forth above assume that the tiling configuration is fixed. However, decoder logic 220 can optionally be configured with storage registers 340 that can be programmed dynamically by graphics controller 202 to indicate tiling parameters or parameters such as the width and height of an individual tile and the number of tiles in each horizontal row of tiles. When this is the case, decoder logic 220 calculates the column addresses based the received memory address, any received offsets or adjustment values, and on any programmed and stored tiling parameters. Lookup tables can be used as described above, but become more complex due to the larger numbers of variables.

Furthermore, although the disclosed embodiment is configured to receive both an address and one or more offsets as part of a CAS operation, the offsets can be provided in different ways. For example, the offsets can be provided to the memory device using a command other than a CAS command and stored in memory device registers prior to an actual CAS operation. In one embodiment, a special command might be used to instruct the memory device regarding whether or not previously provided offsets should be applied in combination with a CAS address. Alternatively, the CAS command itself might indicate whether the offsets should be applied. As yet another alternative, the memory device might be set by a command or through some other means into one of a plurality of addressing modes, in which at least one of the addressing modes uses supplied or stored offsets in combination with received CAS addresses. At least one other of the addressing modes would ignore offset values, in which case the memory cells would be accessed in mutually exclusive or non-overlapping tiles. A similar result could be obtained by setting the offset values to zero.

Figure 3:
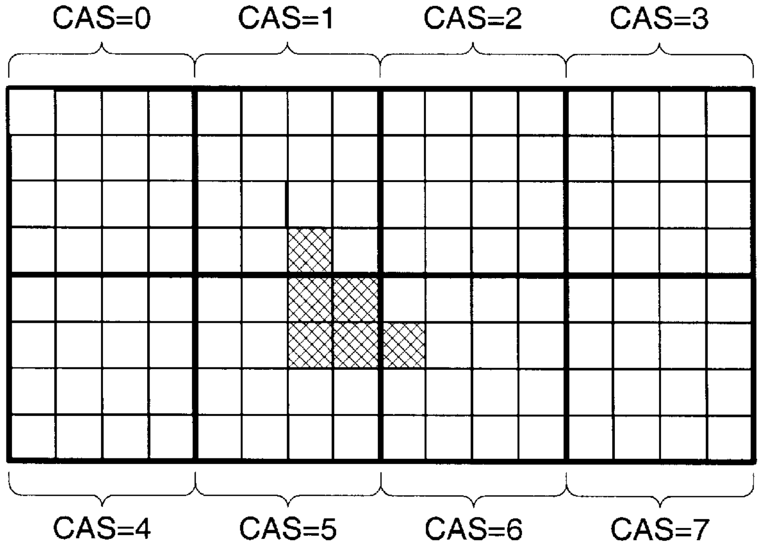
Fig. 3 Prior Art
FIG. 3 illustrates an example of graphics tiling as used in the prior art.

The ability to specify spatial offsets relative to graphics tiles allows for greatly increased memory access efficiency in many situations. In the situation illustrated by FIG. 3, for example, the graphics triangle can be accessed in a single memory operation by specifying a column or CAS address of 1, a horizontal offset of two pixels, and a vertical offset of three pixels. Three memory access cycles would have been required in prior art systems.

Furthermore, the improvements in efficiency are gained with very little in the way of additional hardware. Existing I/O paths are utilized and no additional logic is introduced in the I/O paths. Instead, minimal logic is added to calculate appropriate addresses for the column decoders. In some situations, it will be desirable to increase the number of independent column decoders. In other situations, however, existing designs will already utilize a sufficient number of column decoders, and only the address calculation logic will need to be added to such designs.

Packet Router

Figure 11:
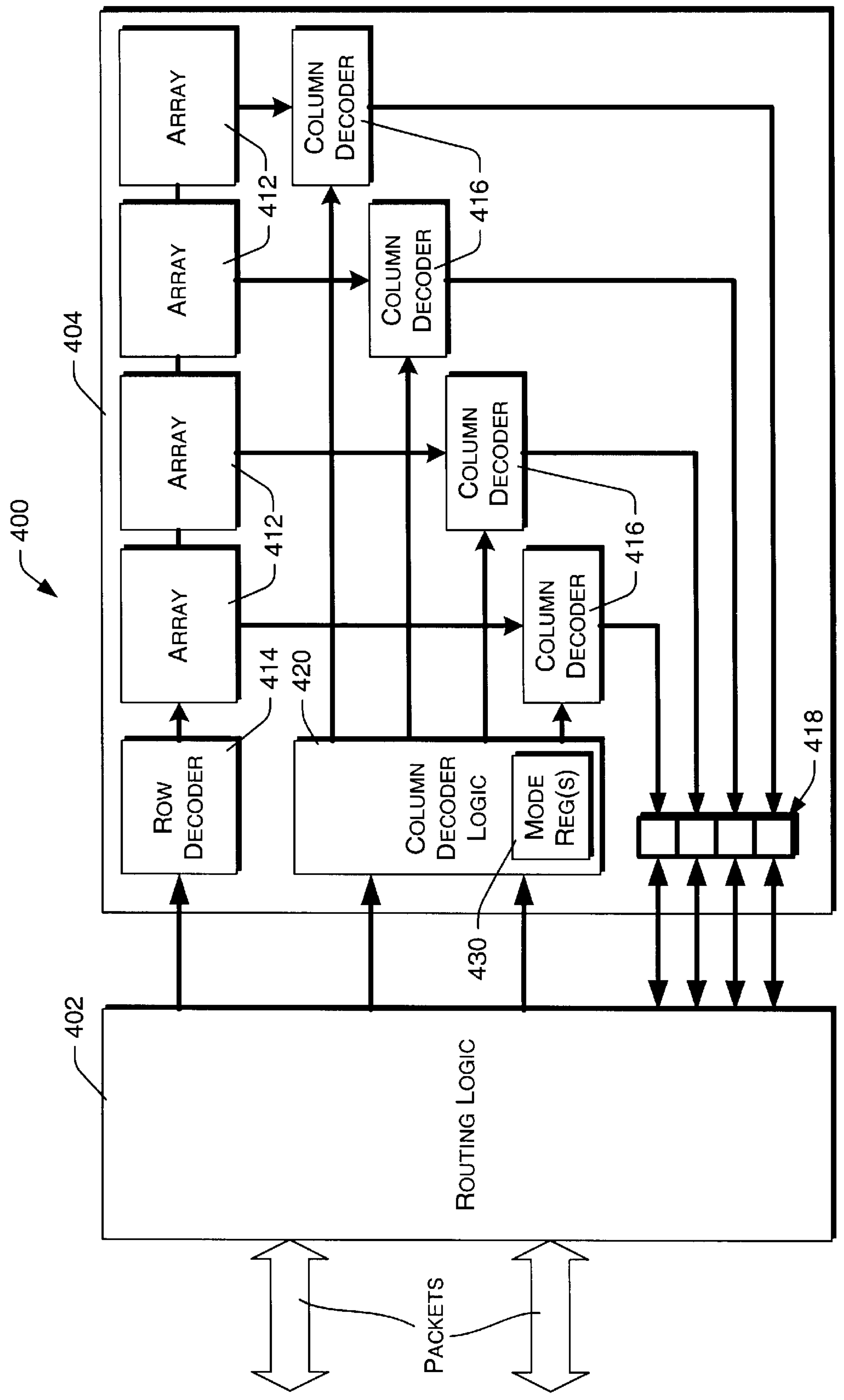
FIG. 11 is a simplified block diagram showing pertinent components of a packet routing device incorporating a memory device similar to that shown in FIG. 4.

FIG. 11 shows a packet router or packet routing system 400 that includes a packet routing logic 402 and one or more DRAM memory devices 404 configured for use as intermediate storage of information packets as they are handled by routing logic 402. Each memory device 404 is configured similarly to the device described above with reference to FIG. 4, in that memory may be accessed at alignments that are not necessarily multiples of the data I/O path width. Packet routing logic 402 receives packets and routes them in accordance with information contained in headers of the packets.

Each memory device includes a plurality of memory arrays 412 and an associated row decoder 414. Each memory array 412 comprises a plurality of memory storage units configured to store information packets.

Memory device 400 has column or lane selection logic that includes a lane decoder 416 associated with each array 412. There is a data I/O lane 418 corresponding to each array 412 and lane decoder 416. The data I/O lanes are accessed in parallel by routing logic 402. The column or lane selection logic also includes address specification logic 420, also referred to herein as decoder logic, which calculates decoder addresses for each of lane decoders 416. The lane decoders are configured to receive independent address specifications from decoder logic 420. The address specifications provided by decoder logic 420 are calculated or derived from a CAS column address and one or more adjustment or mode values provided by routing logic 402. The lane decoders are responsive to the address specifications to select memory storage units for transfer through data lanes 418. Each storage unit, data I/O lane, and lane decoder is one or more bytes in width.

Routing logic 402 is configured to store routable packets such as TCP or IP packets, or packets formatted in accordance with some other communications protocol. The packets are preferably arranged in memory so that each packet can be accessed in a single CAS operation—the packets are aligned at CAS boundaries.

Figure 12:
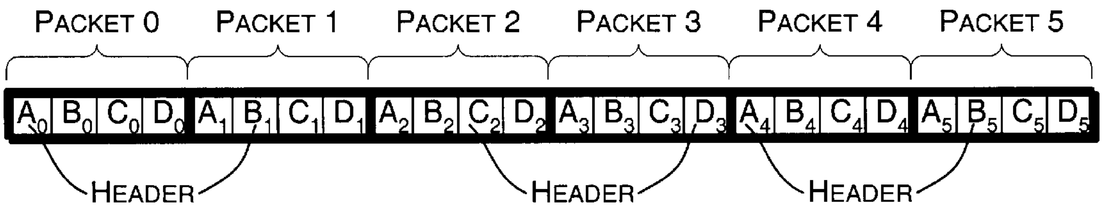
FIG. 12 illustrates an arrangement of memory storage units used to store information packets and headers of such information packets in the system shown by FIG. 11.

FIG. 12 shows a preferred alignment of packets within the memory illustrated in FIG. 11, in a simplified example in which it is assumed that each packet occupies four storage units, and that the header of each packet is contained within a single storage unit. This example assumes four parallel data I/O lanes, A, B, C, and D. The nomenclature used to designate storage units in FIG. 12 is the same as that used above.

The packets are aligned with CAS access boundaries, so that an entire packet can be accessed in parallel in a single memory operation. For example, Packet 0 is stored in memory storage units $A_0$, $B_0$ $C_0$, and $D_0$; Packet 1 is stored in memory storage units $A_1$, $B_1$, $C_1$, and $D_1$; and so on. As illustrated, however, the headers are rearranged within the packets so that the headers are dispersed across the four memory arrays: the header of Packet 0 is stored in $A_0$, the header of Packet 1 is stored at $B_1$, the header of Packet 2 is stored at $C_2$, and the header of Packet 4 is stored at $D_3$. This pattern repeats itself, so that the headers of any four adjacent packets are stored in the four different memory arrays of memory device 202, corresponding to the four data lanes 418 of memory device 202.

Decoder logic 420 has one or more mode registers that can be dynamically programmed to set different operation modes. In the normal mode, conventional CAS cycles are performed to read individual packets. However, the decoding logic can be dynamically configured to set a header mode in which different column addresses are provided to the respective column decoders 416, so that a plurality of packet headers can be read through data I/O lanes 418 during a CAS memory access cycle. In this mode, a column is specified by routing logic 402 during the CAS cycle. In response to the column specification, the decoder logic calculates individual column addresses in a manner that is determined by the predefined layout of headers within adjacent portions of memory. In particular, the column addresses are calculated to select the column from each memory array that holds the packet header.

Figure 13:
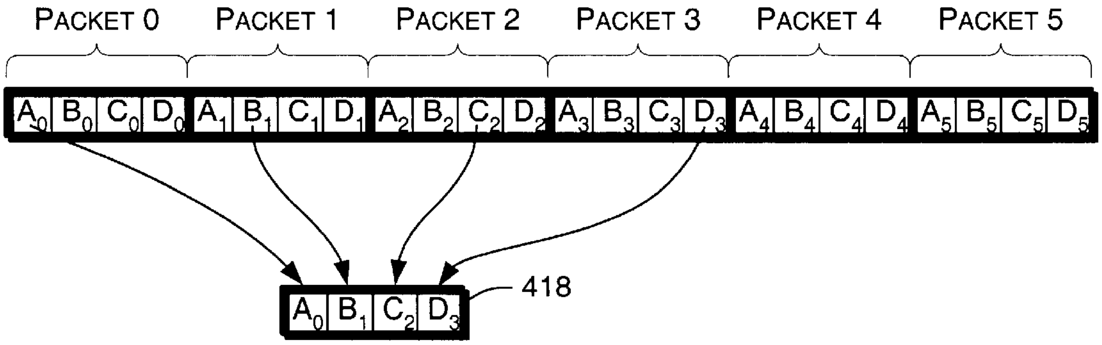
FIG. 13 illustrates an example of accessing information packet headers in the system shown by FIG. 11.

FIG. 13 shows such a selection, assuming that column 0 has been specified during the CAS operation. As shown, the decoder logic selects storage units $A_0$, $B_0$, $C_2$, and $D_3$—those storage units in which the packet headers are stored—and allows access to those storage units through data I/O lanes 418.

The header mode can be set in various ways. For example, the CAS command itself might indicate whether or not the header mode is to be used. As another example, an address bit might be used to indicate whether normal or header mode is to be used. Alternatively, a command might be used to set the memory device into a header mode. As yet another alternative, the memory device might include a register that is programmable to indicate whether or not the header mode is to be employed.

This represents a significant improvement in the ability to access header information. Specifically, the ability to access—in a single memory cycle—either an entire packet or a plurality of packet headers allow much more efficient router operation.

Conclusion

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A memory device comprising:

an integrated circuit, the integrated circuit comprising:

a plurality of storage units;

a data I/O path through which groups of the storage units arc accessed in parallel; and selection logic configured to select groups of the storage units for parallel access Through the data I/O path;

wherein the selection logic is configurable to select a first group of storage units that includes a particular one of the storage units, and to select a second, different group of storage units that also includes the particular one of the storage units.

2. A memory device as recited in claim 1, wherein the selection logic is also configurable to select mutually exclusive groups of the storage units.

3. A memory device as recited in claim 1, wherein the plurality of storage units are arranged in a plurality of arrays, and wherein each group includes at least one storage unit from each array.

4. A memory device as recited in claim 1, wherein the selection logic is configurable by means of a received offset value.

5. A memory device as recited in claim 1, wherein the selection logic is configurable by means of a received mode command.

6. A memory device as recited in claim 1, wherein the selection logic is configurable by means of a received CAS command.

7. A memory device as recited in claim 1, wherein the selection logic is configurable by means of a received address command.

8. A memory device as recited in claim 1, further comprising a storage register that is programmable to configure the selection logic.

9. A memory device comprising:

a plurality of memory cells;

a data I/O path through which groups of the memory cells are accessed in parallel; and selection logic configured to select memory cells for parallel access through the data I/O path;

wherein the selection logic is configurable to allow selection of overlapping groups of the memory cells for parallel access through the data I/O path; and wherein the plurality of memory cells, the data I/O path, and the selection logic are part of a single integrated circuit.

10. A memory device as recited in claim 9, wherein the selection logic is also configurable to allow selection of mutually exclusive groups of the memory cells.

11. A memory device as recited in claim 9, wherein the selection logic is responsive to an address specification to select the overlapping groups of memory cells.

12. A memory device as recited in claim 9, wherein the selection logic is responsive to an address and at least one offset to select the overlapping groups of memory cells.

13. A memory device as recited in claim 9, wherein the selection logic is responsive to an address and at least one off set to select the overlapping groups of memory cells, wherein the address and at least one offset are received during a memory access operation.

14. A memory device as recited in claim 9, wherein the selection logic is responsive to an address and at least one offset to select the overlapping groups of memory cells, wherein said at least one offset is stored in a register prior to a memory access operation.

15. A memory device as recited in claim 9, wherein the selection logic is responsive to an address and at least one offset to select the overlapping groups of memory cells, wherein said at least one offset is stored in the memory device prior to a memory access operation, and wherein the memory device is programmable to indicate whether said at least one offset is to be used in conjunction with a received memory address during a memory access operation.

16. A memory device as recited in claim 9, wherein the selection logic is responsive to an address and a previously stored offset to select the overlapping groups of memory cells.

17. A memory device as recited in claim 9, wherein the selection logic is responsive to an address and an offset to select the overlapping groups of memory cells, the offset being specified relative to a linear sequence of the memory cells.

18. A memory device as recited in claim 9, wherein the selection logic is responsive to an address and an offset to select the overlapping groups of memory cells, the offset being specified in terms of graphics tile columns.

19. A memory device as recited in claim 9, wherein the selection logic is responsive to an address and an offset to select the overlapping groups of memory cells, the offset being specified in terms of graphics tile rows.

20. A memory device as recited in claim 9, wherein the selection logic is responsive to an address, a horizontal offset, and a vertical offset to select the overlapping groups of memory cells, the horizontal offset being specified in terms of graphics tile columns and the vertical offset being specified in terms of graphics tile rows.

21. A memory device as recited in claim 9, the selection logic comprising a plurality of lane decoders, wherein at least two of the lane decoders receive potentially different decoder addresses.

22. A graphic system comprising:

a memory device as recited in claim 9;

a graphics controller that is configured to store graphics information corresponding to rectangular tiles in the groups of memory cells.

23. A memory device comprising:

a plurality of memory cells;

a plurality of parallel data I/O lanes;

I/O lane decoders associated respectively with the data I/O lanes;

decoder logic that is responsive to a memory address and to one or more adjustment values to calculate addresses for the individual I/O lane decoders during a memory access cycle, wherein at least two of the calculated addresses are allowed to differ from each other;

wherein the I/O lane decoders are responsive to the calculated addresses to select memory cells for access through the data I/O lanes during memory access cycle.

24. A memory device as recited in claim 23, wherein the adjustment values allow selection of overlapping groups of memory cells for access through the data I/O lanes during different memory access cycles.

25. A memory device as recited in claim 23, wherein memory device is configured to receive the one or more adjustment values during the memory access cycle.

26. A memory device as recited in claim 23, wherein memory device is configured to receive the one or more adjustment values prior to the memory access cycle.

27. A memory device as recited in claim 23, wherein the one or more received adjustment values comprise a lane offset value.

28. A memory device as recited in claim 23, wherein each data I/O lane is a single byte in width.

29. A memory device as recited in claim 23, wherein each data I/O lane is multiple bytes in width.

30. A memory device as recited in claim 23, further comprising:

a storage register containing one or more tiling parameters;

wherein the decoder logic is further responsive to the one or more tiling parameters to calculate the addresses.

31. A memory device as recited in claim 23, wherein the one or more received adjustment values comprise pixel offsets specified relative to graphics tiles.

32. A graphics system comprising:

a memory device as recited in claim 23;

a graphics controller tat is configured to store tiles of graphics information in the memory cells of the memory device;

wherein the adjustment values are received from the graphics controller and are specified in terms of horizontal or vertical pixel offsets relative to the rectangular tiles of graphics information.

33. A graphics system comprising:

a memory device as recited in claim 23;

a graphics controller that is configured to store tiles of graphics information in the memory cells of the memory device;

wherein the adjustment values are received from the graphics controller and are specified in terms of horizontal or vertical pixel offsets relative to the rectangular tiles of graphics information;

the memory device further comprising a storage register containing one or more tiling parameters that are programmable by the graphics controller;

wherein the decoder address logic is further responsive to the one or more tiling parameters to calculate the addresses for the individual I/O lane decoders.

34. A memory device as recited in claim 23, wherein during the memory access cycle, a plurality of columns from the plurality of memory cells are accessed in parallel.

35. A memory device as recited in claim 23, wherein the memory access cycle is a single CAS access cycle.

36. An integrated circuit comprising:

a plurality of memory arrays having memory cell columns;

a plurality of parallel data I/O lanes corresponding respectively to the memory arrays;

column selection logic tat is configurable to select potentially different memory cell columns of the respective memory arrays for parallel access through the data I/O lanes in a single memory access cycle.

37. An integrated circuit as recited in claim 36, wherein the column selection logic is also configurable to select the same memory cell columns of each of the respective memory arrays for parallel access through the data I/O lanes.

38. An integrated circuit as recited in claim 36, wherein the column selection logic is responsive to a memory address and to one or more adjustment values to select the potentially different memory cell columns of the respective memory arrays.

39. An integrated circuit as recited in claim 36, wherein the column selection logic is responsive to a memory address and to a lane offset value to select the potentially different memory cell columns of the respective memory arrays.

40. An integrated circuit as recited in claim 36, wherein each data I/O lane is a single byte in width.

41. An integrated circuit as recited in claim 36, wherein each data I/O lane is multiple bytes in width.

42. An integrated circuit as recited in claim 36, wherein the column selection is responsive to memory address and to one or more adjustment values to select the potentially different memory cell columns of the respective memory arrays, wherein the memory address and adjustment values are received during a memory access command.

43. An integrated circuit as recited in claim 36, wherein the column selection logic is responsive to a memory address and to one or more adjustment values to select the potentially different memory cell columns of the respective memory arrays, wherein the memory address is received during a memory access commend and the adjustment values are received prior to the memory access command.

44. An integrated circuit as recited in claim 36, further comprising:

a storage register containing one or more filing parameters; and wherein the column selection logic is responsive to a memory address, one or more offset values, and the one or more tiling parameters to select the potentially different memory cell columns of the respective memory arrays.

45. An integrated circuit as recited in claim 36, wherein the column selection logic is responsive to a memory address and to an adjustment value to select the potentially different memory cell columns of the respective memory arrays, wherein the received adjustment value comprises a pixel offset specified relative to an array of graphics tiles.

46. A graphics system comprising:

an integrated circuit as recited in claim 36;

a graphics controller that is configured to store graphics information corresponding to a rectangular tile of pixels in the memory cells of the integrated circuit.

47. A graphics system comprising:

an integrated circuit as recited in claim 36;

a graphics controller that is configured to store graphics information corresponding to a rectangular tile of pixels in the memory cells of the integrated circuit;

the integrated circuit further comprising a storage register containing one or more tiling parameters that are programmable by the graphics controller;

wherein the column selection logic is responsive to a memory address received from the graphics controller, one or more offset values received from the graphics controller, and the one or more tiling parameters to select the potentially different memory cell columns of the respective memory arrays.

48. A packet router comprising:

an integrated circuit as recited in claim 36;

packet routing logic that stores information packets in the integrated circuit, the information packets having headers that specify packet routing information; and wherein the column selection logic selects the potentially different memory cell columns so that a plurality of packet headers are accessed in parallel through the data I/O lanes.

49. An integrated circuit as recited in claim 36, wherein during the single memory access cycle, a plurality of the memory cell columns are accessed in parallel.

50. An integrated circuit as recited in claim 36, wherein the single memory access cycle is a single CAS access cycle.

51. A memory device that is configurable for use as graphics memory in which memory storage units represent rectangular tiles of graphics pixels, the memory device including an integrated circuit, the integrated circuit comprising:

a plurality of memory storage units configured to store graphics data;

a plurality of parallel data I/O lanes that collectively transfer memory data corresponding to a rectangular tile of graphics pixels during a memory access cycle;

selection logic that is responsive to a received memory address and to one or more offset values to select storage units corresponding to tiles of graphics pixels for parallel access through the data I/O lanes;

wherein the selection logic is configurable to allow selection of overlapping tiles of the memory cells for parallel access trough the data I/O path.

52. A memory device as recited in claim 51, wherein the selection logic is configurable to allow selection of non-overlapping tiles of the memory cells for parallel access through the data I/O path.

53. A memory device as recited in claim 51, wherein each data I/O lane is a single byte in width.

54. A memory device as recited in claim 51, wherein each data I/O lane is multiple bytes in width.

55. A memory device as recited in claim 51, wherein:

each rectangular tile has a horizontal pixel dimension, and;

the one or more offset values comprise a horizontal pixel offset.

56. A memory device as recited in claim 51, wherein:

each rectangular tile has a horizontal pixel dimension, and;

the one or more offset values comprise a horizontal pixel offset value that is not constrained to multiples of the horizontal pixel dimension.

57. A memory device as recited in claim 51, wherein:

each rectangular tile has a vertical pixel dimension, and;

the one or more offset values comprise a vertical pixel offset.

58. A memory device as recited in claim 51, wherein:

each rectangular tile has a vertical pixel dimension, and;

the one or more offset values comprise a vertical pixel offset that is not constrained to multiples of the vertical pixel dimension.

59. A memory device as recited in claim 51, wherein:

each rectangular tile has a horizontal pixel dimension and a vertical pixel dimension;

the one or more offset values comprise a horizontal pixel offset and a vertical pixel offset.

60. A memory device as recited in claim 51, wherein:

each rectangular file has a horizontal pixel dimension and a vertical pixel dimension;

the one or more offset values comprise a horizontal pixel offset that is not constrained to multiples of the horizontal pixel dimension and a vertical pixel offset tat is not constrained to multiples of the vertical pixel dimension.

61. A memory device as recited in claim 51, further comprising a storage register containing one or more tiling parameters, wherein:

each rectangular file has a vertical pixel dimension, and;

the one or more offset values comprise a vertical pixel offset that is not constrained to multiples of the vertical pixel dimension;

wherein the selection logic is further responsive to the one or more tiling parameters to select storage units corresponding to tiles of graphics pixels.

62. A memory device that is configurable for use as graphics memory in which memory storage units represent files of graphics pixels having at least two pixel dimensions, comprising:

a plurality of arrays of memory storage units configured to store graphics memory data;

a plurality of parallel data I/O lanes corresponding respectively to the arrays of memory storage units, wherein the parallel data I/O lanes collectively transfer memory data corresponding to a rectangular tile of graphics pixels during a memory access cycle;

lane decoders associated respectively with the data I/O lanes and the arrays of memory storage units;

address specification logic that is responsive to a received memory address and to one or more dimensional offset values to calculate decoder addresses for the lane decoders during a 'memory access cycle, wherein at least two of the decoder addresses are different from each other;

wherein the lane decoders are responsive to the address specifications to select memory storage units corresponding to a file of graphics pixels;

wherein the one or more dimensional offset values are not restricted to multiples of the pixel dimensions.

63. A memory device as recited in claim 62, wherein each data I/O lane is a single byte in width.

64. A memory device as recited in claim 62, wherein each data I/O lane is multiple bytes in width.

65. A memory device as recited in claim 62, wherein the one or more dimensional offset values comprise a horizontal pixel offset value and a vertical pixel offset value.

66. A memory device as recited in claim 62, wherein:

the one or more dimensional offset values comprise a horizontal pixel offset value and a vertical pixel offset value; and the horizontal pixel offset value and the vertical pixel offset value are not constrained to multiples of the two pixel dimensions.

67. A memory device as recited in claim 62, further comprising a storage register containing one or more tiling parameters, wherein:

wherein the address specification logic is further responsive to the one or more tiling parameters to calculate the different decoder addresses.

68. A memory device as recited in claim 62, wherein during the memory access cycle, a plurality of columns from the plurality of arrays of memory storage units are accessed in parallel.

69. A memory device as recited in claim 62, wherein the memory access cycle is a single CAS access cycle.

70. A memory device comprising:

a plurality of arrays of memory storage units;

at least one row decoder that selects at least one row of memory storage units across the plurality of arrays of memory storage units;

a plurality of column decoders tat select columns of the plurality of arrays of memory storage units responsive to a plurality of column addresses, each respective column decoder of the plurality of column decoders associated with a respective array of memory storage units of the plurality of arrays of memory storage units; and address specification logic tat is responsive to at least one received memory address and to one or more adjustment values to calculate the plurality of column addresses for the plurality of column decoders, wherein at least two of the plurality of column addresses are different from each other;

wherein respective column decoders of the plurality of column decoders receive respective column addresses of the plurality of column addresses.

71. A memory device as recited in claim 70, further comprising:

a plurality of data I/O lanes corresponding respectively to the plurality of column decoders and coupled thereto.

72. A memory device as recited in claim 70, wherein each memory storage unit comprises a single byte or multiple bytes.

73. A memory device as recited in claim 70, further comprising:

a storage register that is programmable to configure the address specification logic.

74. A memory device as recited in claim 70, further comprising:

a plurality of column address communication channels that couple the address specification logic to respective column decoders of the plurality of column decoders.

75. A memory device as recited in claim 70, wherein the single respective column decoders receive the respective column addresses during a single memory access cycle.

76. A memory device as recited in claim 75, wherein to single memory access cycle comprises a single CAS access cycle.

77. A memory device as recited in claim 75, wherein during the single memory access cycle, a plurality of columns from the plurality of arrays of memory storage units are accessed in parallel via to plurality of column decoders.

78. A memory device as recited in claim 70, wherein the address specification logic is configurable using at least one of a received address command, a received CAS command, a received mode command, or the one or more adjustment values.

79. A memory device as recited in claim 70, wherein the one or more adjustment values are specified in terms of graphics file rows or graphics tiles columns.

80. A memory device as recited in claim 70, wherein the one or more adjustment values allow selection of overlapping groups of memory storage units for access through the plurality of column decoders during different memory access cycles.

81. A memory device as recited in claim 70, wherein (i) the at least one received memory address and the one or more adjustment values are received during a memory access command or (ii) the at least one received memory address is received during a memory access command and the one or more adjustment values are received prior to the memory access command.

82. A memory device as recited in claim 70, wherein the one or more adjustment values comprise a horizontal pixel offset value and/or a vertical pixel offset value.

83. A memory device as recited in claim 70, wherein the one or more adjustment values comprise at least one lane offset value.

* * * * *